US012325243B2

(12) United States Patent
Maida et al.

(10) Patent No.: US 12,325,243 B2
(45) Date of Patent: Jun. 10, 2025

(54) MOUNTING MECHANISM FOR LIQUID CONTAINER AND INK STIRRING METHOD FOR INK CARTRIDGE

(71) Applicant: FUJIFILM Corporation, Tokyo (JP)

(72) Inventors: Noriaki Maida, Kanagawa (JP); Naoyuki Morita, Kanagawa (JP); Yuzo Ishikawa, Kanagawa (JP); Kensuke Takada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 18/057,469

(22) Filed: Nov. 21, 2022

(65) Prior Publication Data

US 2023/0191790 A1 Jun. 22, 2023

(30) Foreign Application Priority Data

Dec. 17, 2021 (JP) ................................ 2021-205012

(51) Int. Cl.
*B41J 2/175* (2006.01)

(52) U.S. Cl.
CPC ....... *B41J 2/17523* (2013.01); *B41J 2/17513* (2013.01); *B41J 2002/17516* (2013.01)

(58) Field of Classification Search
CPC ................ B41J 2/17523; B41J 2/17513; B41J 2002/17516; B41J 2/17559; B41J 2/1752
See application file for complete search history.

(56) References Cited

U.S. PATENT DOCUMENTS

2016/0288516 A1* 10/2016 Naito .................. B41J 2/17553

FOREIGN PATENT DOCUMENTS

| | | | | | |
|---|---|---|---|---|---|
| JP | 2004034696 | A | * | 2/2004 | .......... B41J 2/17513 |
| JP | 2008273173 | A | * | 11/2008 | .......... B41J 2/17509 |
| JP | 2009-001011 | A | | 1/2009 | |
| JP | 4952655 | B2 | | 6/2012 | |
| JP | 2013159037 | A | * | 8/2013 | ............. B41J 2/175 |
| JP | 2015-164815 | A | | 9/2015 | |
| JP | 2016-196093 | A | | 11/2016 | |
| JP | 2021-070196 | A | | 5/2021 | |
| WO | WO-2015194154 | A1 | * | 12/2015 | .......... B41J 2/17513 |

OTHER PUBLICATIONS

The extended European search report issued by the European Patent Office on May 17, 2023, which corresponds to European Patent Application No. 22213349.8-1014 and is related to U.S. Appl. No. 18/057,469.

* cited by examiner

*Primary Examiner* — Sharon Polk
(74) *Attorney, Agent, or Firm* — Studebaker Brackett PLLC

(57) ABSTRACT

There is provided a mounting mechanism for a liquid container capable of suppressing a damage of a mouthpiece and enabling efficient stirring, and there is provided an ink stirring method for an ink cartridge using the mechanism. The mounting mechanism for a liquid container includes: a holder portion that fixes a mouthpiece serving as an outlet of a liquid of a liquid container in which the liquid is contained and that holds the liquid container; a set portion that has a fitting part fitted to the mouthpiece and causing the liquid to flow out of the mouthpiece; a tube that communicates with the fitting part; and a main body that is connected to the set portion by using the tube, in which the set portion is movable with respect to the main body.

17 Claims, 6 Drawing Sheets

MOUNTING MECHANISM FOR LIQUID CONTAINER AND INK STIRRING METHOD FOR INK CARTRIDGE

CROSS-REFERENCE TO RELATED APPLICATION

The present application claims priority under 35 U.S.C § 119 (a) to Japanese Patent Application No. 2021-205012 filed on Dec. 17, 2021, which is hereby expressly incorporated by reference, in its entirety, into the present application.

BACKGROUND OF THE INVENTION

1. Field of the Invention

The present disclosure relates to a mounting mechanism for a liquid container and an ink stirring method for an ink cartridge, and particularly relates to a mechanism for mounting a liquid container represented by an ink pouch to a device such as a printer and a method for using the mechanism.

2. Description of the Related Art

JP4952655B discloses a fluid ejecting apparatus comprising: a fluid container having a containing part that contains an ejecting fluid and a delivery port that delivers the fluid contained in the containing part; a housing case that houses the fluid container; a fluid jetting part that jets a fluid to an ejection object; a supply needle having a flow passage communicating with the fluid jetting part; a guard cover projecting to cover the supply needle; a guide that slidably guides the fluid container to a fixed position where the delivery port is inserted into the supply needle after being fitted to the fluid container; and a fastening member that fastens the fluid container guide to the fix position to the housing case. In the fluid container of the fluid ejecting apparatus, an engaging part that engages with the fastening member is formed near the delivery port, and, in the guard cover, a through-hole is formed at a position corresponding to the engaging part of the fluid container guided to the fixed position. Further, the fluid ejecting apparatus disclosed in JP4952655B comprises a main body housing that houses the fluid jetting part, in which the housing case is pivotally attached to the main body housing so as to be openable and closable by rotationally moving about a rotational axis, and the fluid container is inclined with respect to an inner bottom surface of the housing case at an angle of holding the housing part from below in the direction of gravitational force through transition of the housing case from the closed state to the opened state.

JP2016-196093A discloses an ink container that stores an ink pack comprising an ink outlet for causing a contained ink to flow out to an outside. In this ink container, the stored ink pack is configured to take a first posture in which an ink outlet side is inclined downward and a second posture in which a gap with the ink container is wider than in the first posture. In addition, the ink container disclosed in JP2016-196093A further comprises a placing member having a placing surface on which the ink pack is placed, in which the placing member is variable between a first state in which the placing surface is inclined with respect to a horizontal plane and the ink pack is in the first posture and a second state in which an inclination angle of the placing surface with respect to the horizontal plane is gentler than in the first state and the ink pack is in the second posture.

SUMMARY OF THE INVENTION

JP2016-196093A discloses a method of stirring an ink in an ink pack by switching a posture of the ink pack between a first posture and a second posture, for the purpose of making a material concentration in the ink pack uniform in a case where a sedimentation pigment is contained in the ink, as in a case of a white UV ink (see paragraph 0064 of JP2016-196093A).

However, as shown in FIG. 7 of JP2016-196093A, in a configuration in which the ink pack is set in a laid state, it is difficult to sufficiently stir white ink only by shaking the ink pack by the inclination of the placing member, which is not practical. In addition, it is necessary to secure a space for disposing a posture switching mechanism shown in FIG. 7 of JP2016-196093A and to increase a cost by increasing the number of parts.

JP4952655B has an object of securing a disposition space for a large-capacity ink pack (fluid container), and has a structure in which the ink pack is mounted in an upper housing which moves about a rotation shaft. However, JP4952655B does not describe an ink stirring. Regarding the configuration disclosed in JP4952655B, as shown in FIG. 2 and FIG. 3 of JP4952655B, in a configuration in which the ink pack is set in a laid state, it is difficult to sufficiently stir a white ink, which tends to precipitate, only by opening and closing the upper housing about the rotation shaft.

Therefore, in an actual printing facility or the like, for example, for an ink pouch of a white ink used in a wide format (WF) inkjet printer, it is a mainstream practice for a user to perform a stirring operation of "shaking the pouch several times" by attaching and detaching the ink pouch daily. Such a stirring operation is widely performed as a general operation in the printing industry.

However, a mouthpiece of an inexpensive ink pouch is made of plastic and withstands several times of attachment and detachment, but daily attachment and detachment (tens to hundreds of times of attachment and detachment during a period until the ink is used up) are not expected. Therefore, there is a concern that the mouthpiece portion may be damaged and the ink may leak into the printer.

The present disclosure has been made in view of such circumstances, and an object thereof is to provide a mounting mechanism for a liquid container capable of suppressing a damage of a mouthpiece and enabling efficient stirring, and to provide an ink stirring method for an ink cartridge using the mechanism.

One aspect of the present disclosure relates to a mounting mechanism for a liquid container comprising: a holder portion that fixes a mouthpiece serving as an outlet of a liquid of a liquid container in which the liquid is contained and that holds the liquid container; a set portion that has a fitting part fitted to the mouthpiece and causing the liquid to flow out of the mouthpiece; a tube that communicates with the fitting part; and a main body that is connected to the set portion by using the tube, in which the set portion is movable with respect to the main body.

According to the present aspect, since the holder portion and the set portion is movable integrally with respect to the main body in a state in which the mouthpiece of the liquid container held by holder portion and the fitting part of the set portion are fitted to each other, a damage of the mouthpiece can be suppressed, and efficient stirring can be performed.

In the mounting mechanism for a liquid container according to another aspect of the present disclosure, the set portion may be separable from the main body within a range where the tube reaches.

In the mounting mechanism for a liquid container according to another aspect of the present disclosure, the set portion may be connected to the main body via a first rotation shaft, and the set portion may be rotatably movable about the first rotation shaft with respect to the main body.

In the mounting mechanism for a liquid container according to another aspect of the present disclosure, a rotation direction of the set portion by the first rotation shaft may be a top-bottom direction.

In the mounting mechanism for a liquid container according to another aspect of the present disclosure, it is preferable that a direction of a smallest value among dimensions in directions of a length, a width, and a thickness of the liquid container is parallel to the first rotation shaft.

In the mounting mechanism for a liquid container according to another aspect of the present disclosure, in a case where a length direction of the liquid container parallel to an orientation of the mouthpiece is a first direction, a width direction of the liquid container orthogonal to the first direction is a second direction, and a thickness direction of the liquid container orthogonal to the first direction and the second direction is a third direction, assuming that a length of the liquid container in the first direction is L1, a width of the liquid container in the second direction is L2, and a thickness of the liquid container in the third direction is L3, a relationship of L1>L2>L3 may be satisfied, and the first rotation shaft may be parallel to the third direction.

In the mounting mechanism for a liquid container according to another aspect of the present disclosure, the holder portion may be connected to the set portion via a second rotation shaft, and the holder portion may be rotatably movable about the second rotation shaft with respect to the set portion.

In the mounting mechanism for a liquid container according to another aspect of the present disclosure, a rotation direction of the holder portion by the second rotation shaft may be a top-bottom direction.

In the mounting mechanism for a liquid container according to another aspect of the present disclosure, it is preferable that the mouthpiece and the fitting part are fitted to each other by rotatably moving the holder portion that holds the liquid container about the second rotation shaft.

In the mounting mechanism for a liquid container according to another aspect of the present disclosure, it is preferable that the first rotation shaft and the second rotation shaft are parallel to each other.

In the mounting mechanism for a liquid container according to another aspect of the present disclosure, it is preferable that the mounting mechanism for a liquid container further comprises an avoidance mechanism for avoiding a simultaneous movement of a rotational movement of the set portion with respect to the main body by the first rotation shaft and a rotational movement of the holder portion with respect to the set portion by the second rotation shaft.

In the mounting mechanism for a liquid container according to another aspect of the present disclosure, the avoidance mechanism may selectively realize a first state in which the rotational movement of the set portion with respect to the main body by the first rotation shaft is restrained and the rotational movement of the holder portion with respect to the set portion by the second rotation shaft is permitted and a second state in which the rotational movement of the set portion with respect to the main body by the first rotation shaft is permitted and the rotational movement of the holder portion with respect to the set portion by the second rotation shaft is restrained.

In the mounting mechanism for a liquid container according to another aspect of the present disclosure, the avoidance mechanism may include a connecting member that selectively integrates the set portion with either the main body or the holder portion, and the connecting member may be movable between a first position where the first state is attained by engagement of the connecting member with the main body and a second position where the second state is attained by engagement of the connecting member with the holder portion.

In the mounting mechanism for a liquid container according to another aspect of the present disclosure, the connecting member may be rotatably supported by the set portion via a third rotation shaft.

In the mounting mechanism for a liquid container according to another aspect of the present disclosure, it is preferable that the avoidance mechanism is switchable between a state in which the rotational movement of the set portion with respect to the main body by the first rotation shaft is possible and a state in which the rotational movement of the holder portion with respect to the set portion by the second rotation shaft is possible in a single operation.

In the mounting mechanism for a liquid container according to another aspect of the present disclosure, the liquid may be an ink, and the liquid container may be a pouch-shaped ink cartridge.

In the mounting mechanism for a liquid container according to another aspect of the present disclosure, the liquid may be a white ink containing a white pigment.

In the mounting mechanism for a liquid container according to another aspect of the present disclosure, the mouthpiece may be made of plastic.

Still another aspect of the present disclosure relates to an ink stirring method for an ink cartridge, the method being performed using a mounting mechanism for an ink cartridge including a holder portion that fixes a mouthpiece serving as an outlet of an ink of an ink cartridge in which the ink is contained and that holds the ink cartridge, a set portion that has a fitting part fitted to the mouthpiece and causing the ink to flow out of the mouthpiece, a tube that communicates with the fitting part, and a main body that is connected to the set portion by using the tube and receives supply of the ink via the tube, the method comprising: fitting the mouthpiece and the fitting part to each other in a state in which the ink cartridge is held in the holder portion; and stirring the ink inside the ink cartridge by integrally moving the holder portion and the set portion with respect to the main body in a state in which the mouthpiece and the fitting part are fitted to each other.

According to the present invention, it is possible to suppress a damage of a mouthpiece of a liquid container and to efficiently stir a liquid inside the liquid container.

DESCRIPTION OF THE PREFERRED EMBODIMENTS

Hereinafter, preferred embodiments of the present invention will be described with reference to the accompanying drawings.

Example of Ink Pouch

Figure 1:
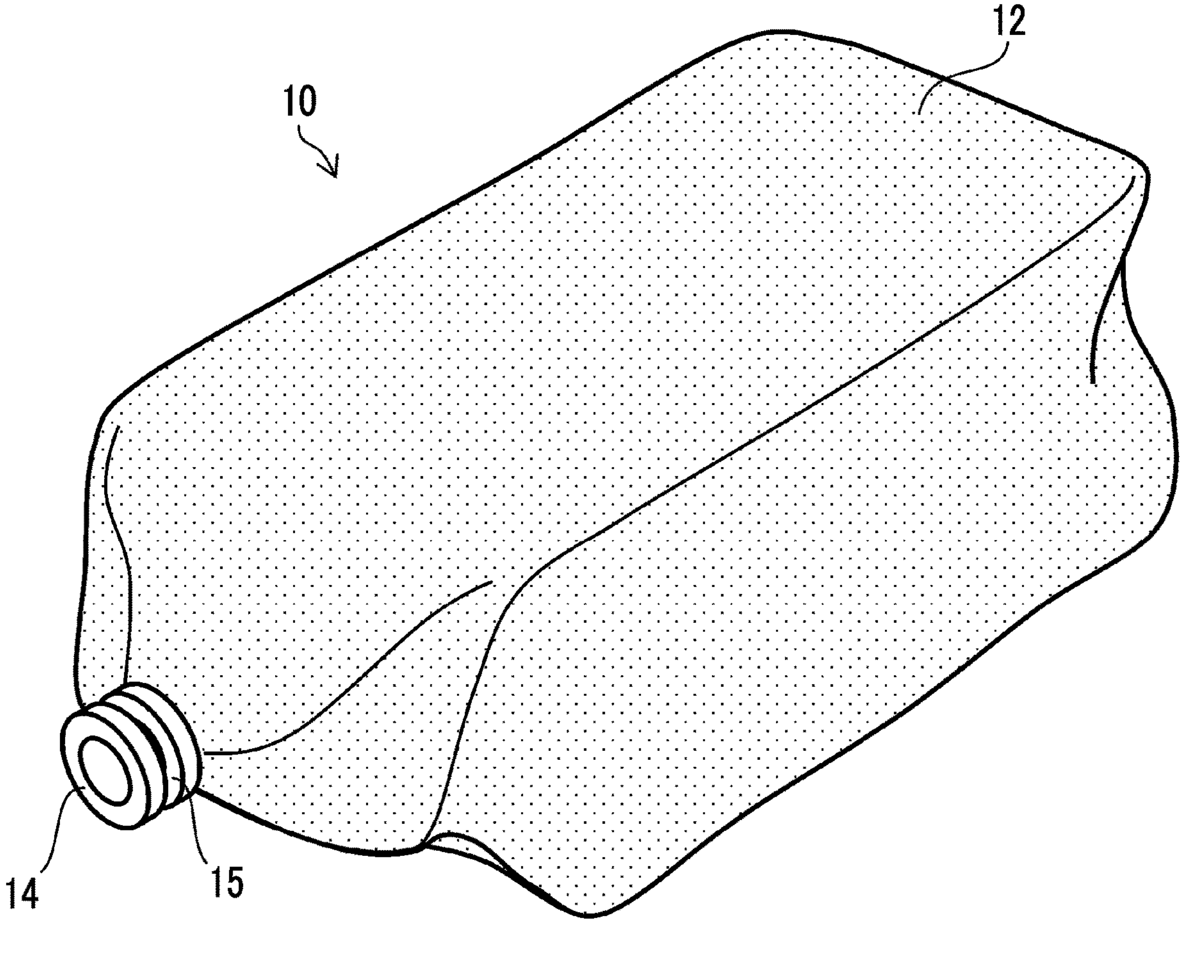
FIG. 1 is a perspective view showing an example of an ink pouch.

FIG. 1 is a perspective view showing an example of an ink pouch 10. The ink pouch 10 comprises a sealed bag 12 that contains ink and a mouthpiece 14 serving as an ink outlet for causing the ink to flow out of the sealed bag 12 to the outside. The sealed bag 12 is made of a flexible material. The mouthpiece 14 may be made of plastic. The ink contained in the ink pouch 10 of the present example is, for example, a white ink containing a white pigment. The white pigment may be, for example, an ink containing titanium oxide. In addition, the ink may be an ultraviolet (UV) curable-type ink.

The ink pouch 10 is an ink cartridge used in a printing apparatus (not shown). The printing apparatus may be, for example, an inkjet printer and, for example, a wide format UV inkjet printer. The ink pouch 10 is mounted in a printing apparatus, and the printing apparatus receives supply of an ink from the ink pouch 10 to execute printing. The ink pouch 10 is an example of the "liquid container" and the "pouch-shaped ink cartridge" in the present disclosure.

Configuration of Mounting Mechanism for Ink Pouch

Figure 2:
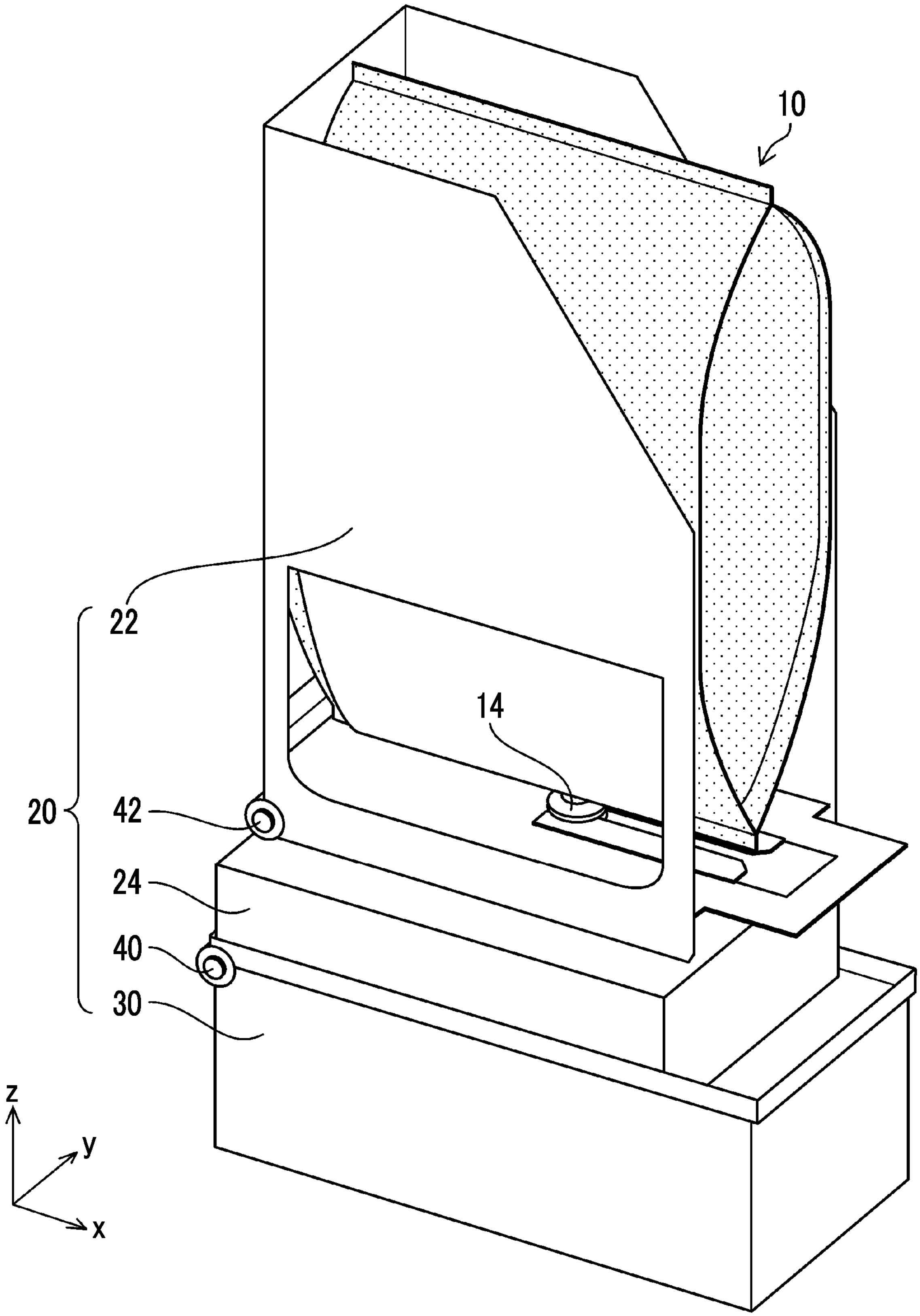
FIG. 2 is a perspective view showing a configuration of a mounting mechanism for an ink pouch according to an embodiment, and shows a state in a case of printing.
Figure 3:
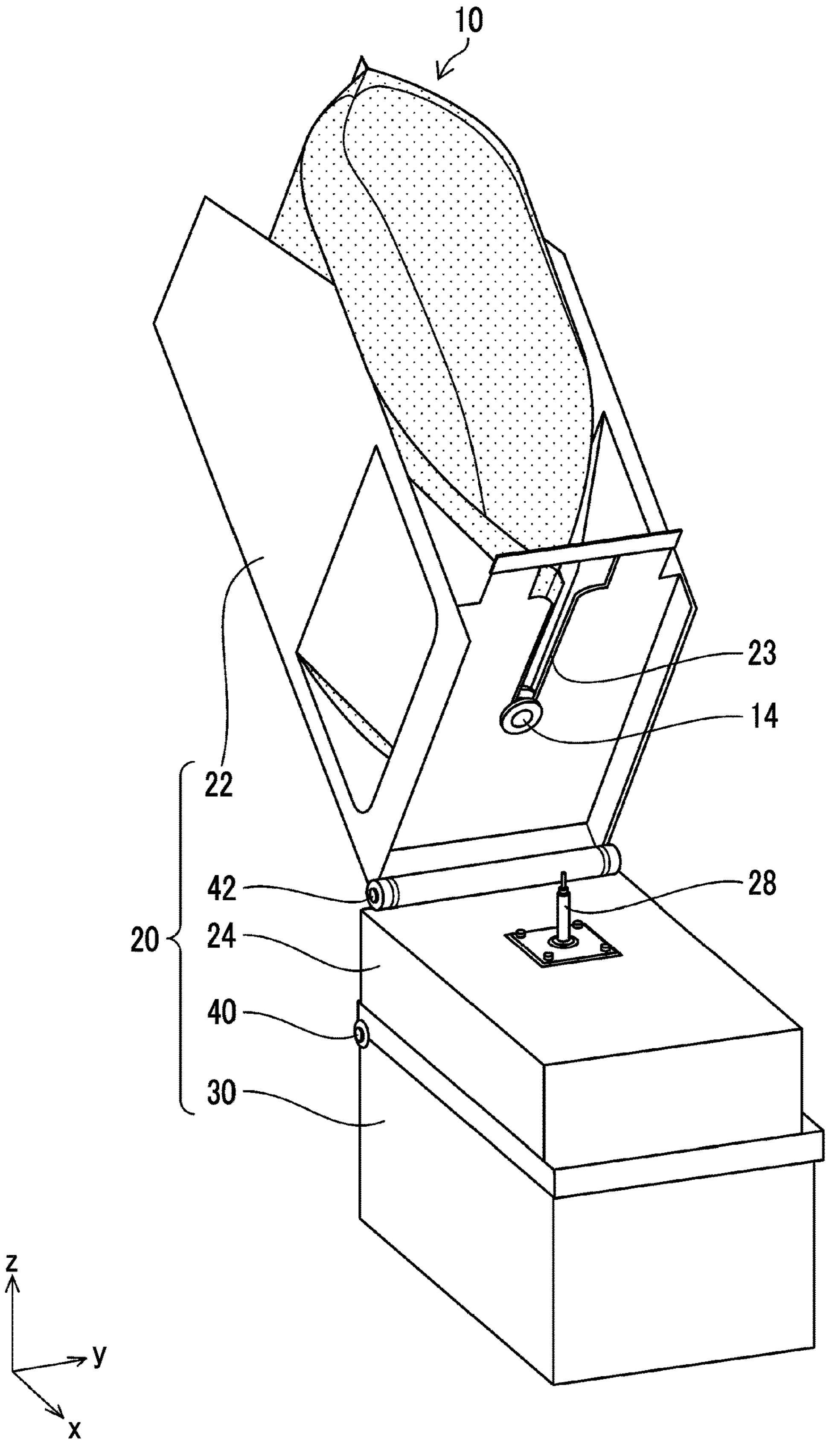
FIG. 3 is a perspective view showing the configuration of the mounting mechanism for an ink pouch according to the embodiment, and shows a state in a case where the ink pouch is set.
Figure 4:
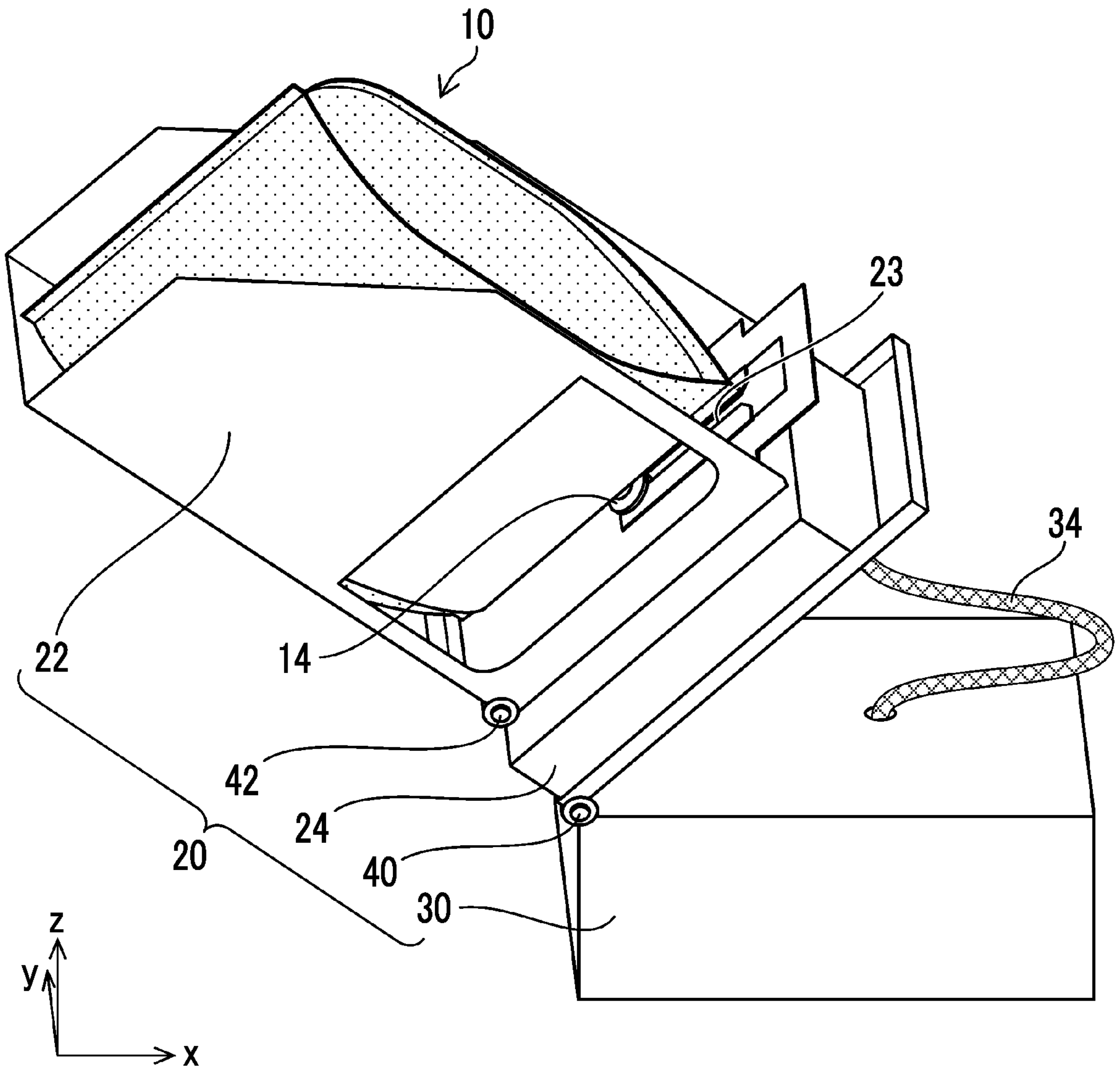
FIG. 4 is a perspective view showing the configuration of the mounting mechanism for an ink pouch according to the embodiment, and shows a state in a case of ink stirring.

FIGS. 2 to 4 are perspective views showing a configuration of a mounting mechanism 20 for an ink pouch 10 according to the embodiment. FIG. 2 shows a state in a case of printing. FIG. 3 shows a state in a case where the ink pouch 10 is set. FIG. 4 shows a state in a case of ink stirring.

The mounting mechanism 20 for the ink pouch 10 comprises a holder portion 22 that houses the ink pouch 10 and a set portion 24 that connects the holder portion 22 and a main body 30. The main body 30 may be a part of a main body of the printing apparatus. The holder portion 22 is a case body that surrounds at least a part of the circumference of the ink pouch 10. The holder portion 22 may have an opening surface for taking in and out the ink pouch 10, or may have an openable/closable box structure.

The set portion 24 is a connection interposition component that is disposed between the holder portion 22 and the main body 30, and functions as a mounting base for the holder portion 22. The holder portion 22 is connected to the main body 30 via the set portion 24. Each of the holder portion 22 and the set portion 24 is movable with respect to the main body 30 (see FIGS. 3 and 4), and the set portion 24 and the main body 30 are connected to each other by using an elongated pipe tube 34 for piping (see FIG. 4).

In the present embodiment, the set portion 24 and the main body 30 are connected to each other via a first rotation shaft 40, and the set portion 24 is rotatably movable with respect to the main body 30 about the first rotation shaft 40. The holder portion 22 and the set portion 24 are connected to each other via a second rotation shaft 42, and the holder portion 22 is rotatably movable with respect to the set portion 24 about the second rotation shaft 42.

As shown in FIG. 2, in a case of a configuration in which the ink pouch 10 is set in a vertical posture such that the ink pouch 10 is erected with the mouthpiece 14 directed downward in the direction of gravitational force, it is preferable that axial directions of the first rotation shaft 40 and the second rotation shaft 42 are parallel to a direction (horizontal direction) orthogonal to the direction of gravitational force.

The holder portion 22 of the present example can be rotated in the top-bottom direction about the second rotation shaft 42 (see FIG. 3), and the set portion 24 can be rotated in the top-bottom direction about the first rotation shaft 40 (see FIG. 4).

As shown in FIG. 3, the holder portion 22 comprises a groove 23 for regulating (restraining) a position of the mouthpiece 14 in holding the ink pouch 10 (see FIG. 3). A recess portion 15 that engages with an edge of the groove 23 is formed on the outer periphery of the mouthpiece 14 (see FIG. 1), and by engaging the recess portion 15 on the outer periphery of the mouthpiece 14 with the edge of the groove 23 and inserting the mouthpiece 14 into the groove 23, the mouthpiece 14 is positioned at a terminal portion on a non-open side of the groove 23. The groove 23 functions as a mouthpiece fixing portion for fixing the mouthpiece 14 at a specific position of the holder portion 22.

The set portion 24 is provided with a fitting part 28 that fits into the mouthpiece 14 of the ink pouch 10 (see FIG. 3). The fitting part 28 is a flow passage connector portion that fits into the mouthpiece 14 to form a flow passage of the ink. For example, the fitting part 28 may function as a male coupler and the mouthpiece 14 may function as a female coupler (socket). In addition, the fitting part 28 may have a hollow needle-shaped structure that is inserted into the mouthpiece 14. As shown in FIG. 3, the holder portion 22 holding the ink pouch 10 is rotated about the second rotation shaft 42 toward the set portion 24, so that the mouthpiece 14 fixed to the holder portion 22 and the fitting part 28 of the set portion 24 are fitted to each other, and the mouthpiece 14 and the fitting part 28 are connected to each other.

The fitting part 28 communicates with the tube 34. That is, one end part of the tube 34 is connected to the fitting part 28, and the other end part of the tube 34 is connected to the main body 30. The tube 34 is preferably a flexible and soft tube. As the tube 34, for example, a super-flexible fluorine tube having a three-layer structure of a fluorine tube as an inner layer, polyamide as an interlayer, and polyurethane as an outer layer can be suitably used. The tube 34 may be a silicon tube or the like. The main body 30 receives supply of an ink from the ink pouch 10 via the tube 34.

In a case where the white ink inside the ink pouch 10 is stirred, as shown in FIG. 4, the set portion 24 and the holder portion 22 in a state in which the ink pouch 10 is mounted are integrally rotated about the first rotation shaft 40, and the ink pouch 10 is shaken together with "the holder portion 22 and the set portion 24" within a range where the tube 34 reaches. By such rotational motion, the white ink in the ink pouch 10 can be sufficiently stirred.

According to the mounting mechanism 20 for the ink pouch 10 according to the present embodiment, the ink pouch 10 can be shaken in a state in which the mouthpiece 14 of the ink pouch 10 held by the holder portion 22 is connected to the fitting part 28 of the set portion 24. Therefore, once the ink pouch 10 is housed in the holder portion 22 and set in the set portion 24, it is not necessary to attach and detach the mouthpiece 14 until the ink is used up. That is, a fitting operation to the mouthpiece 14 can be suppressed only once. Therefore, a damage of the mouthpiece 14 can be suppressed, and ink leakage can also be suppressed.

In FIGS. 2 to 4, an example of a rotation moving mechanism of a double hinge system comprising the first rotation shaft 40 and the second rotation shaft 42 is described. However, at least one of the first rotation shaft 40 or the second rotation shaft 42 may be omitted, so that a configuration in which at least one of the holder portion 22 or the set portion 24 and the main body 30 can be separated from each other is also possible. By configuring the holder portion 22 and the set portion 24 to be separable from each other, the holder portion 22 can be freely moved in a case where the ink pouch 10 is attached and detached. In addition, by configuring the set portion 24 and the main body 30 to be separable from each other within a restraint range of the tube 34, the ink can be stirred by freely moving an integral body of the holder portion 22 holding the ink pouch 10 and the set portion 24 within a movable range of the tube 34 in a case of stirring the ink.

On the other hand, in a case where a structure is adopted in which the holder portion 22 and the set portion 24 can be freely moved by being separated from the main body 30, there is a concern that handling of the tube 34 for piping connecting the set portion 24 and the main body 30 is complicated. Therefore, as illustrated in FIGS. 2 to 4, it is preferable to secure workability and stirring performance in a case where the ink pouch 10 is attached and detached and in a case where the ink is stirred, while regulating the movable ranges of the holder portion 22 and the set portion 24 by a structure comprising the first rotation shaft 40 and the second rotation shaft 42.

In the present embodiment, from the viewpoint of securing sufficient stirring performance of the white ink, it is desirable that a rotation angle at which the set portion 24 can be rotated about the first rotation shaft 40 is 90 degrees or more, and it is more desirable that the rotation angle is 130 degrees or more.

Regarding Simultaneous Movement Avoidance Mechanism

As described above, the mounting mechanism 20 for the ink pouch 10 according to the present embodiment has a structure in which the set portion 24 and the holder portion 22 in a state of holding the ink pouch 10 can be integrally moved with respect to the main body 30, so that the ink pouch 10 can be shaken to stir the ink while the fitting connection between the mouthpiece 14 and the fitting part 28 is maintained.

On the other hand, in the double hinge system comprising the first rotation shaft 40 and the second rotation shaft 42, in a case where a configuration is adopted in which a rotational movement of the set portion 24 by the first rotation shaft 40 and a rotational movement of the holder portion 22 by the second rotation shaft 42 are simultaneously permitted, there is a concern that force is applied to the fitting connection portion between the mouthpiece 14 and the fitting part 28 unintentionally during the ink stirring operation, and the fitting is loosened or the fitting part 28 is detached from the mouthpiece 14, thereby scattering the ink.

In order to avoid such a situation, the mounting mechanism 20 for the ink pouch 10 preferably comprises a simultaneous movement avoidance mechanism for avoiding the simultaneous rotational movement (rotational motion) of the rotational movement of the set portion 24 by the first rotation shaft 40 and the rotational movement of the holder portion 22 by the second rotation shaft 42.

Figure 5:
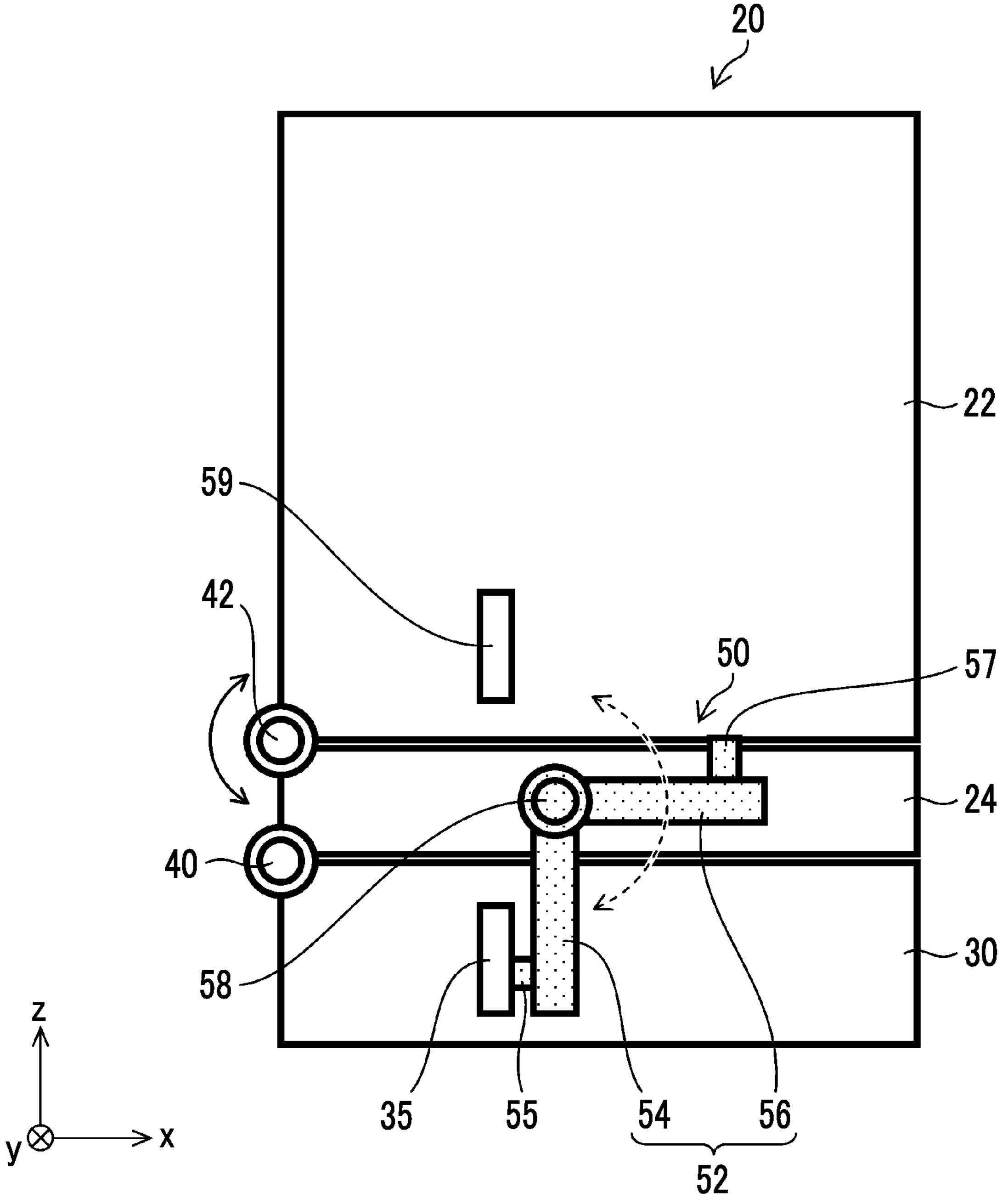
FIG. 5 is a schematic side view showing an example of a simultaneous movement avoidance mechanism, and shows a state in a case where the ink pouch is attached and detached.
Figure 6:
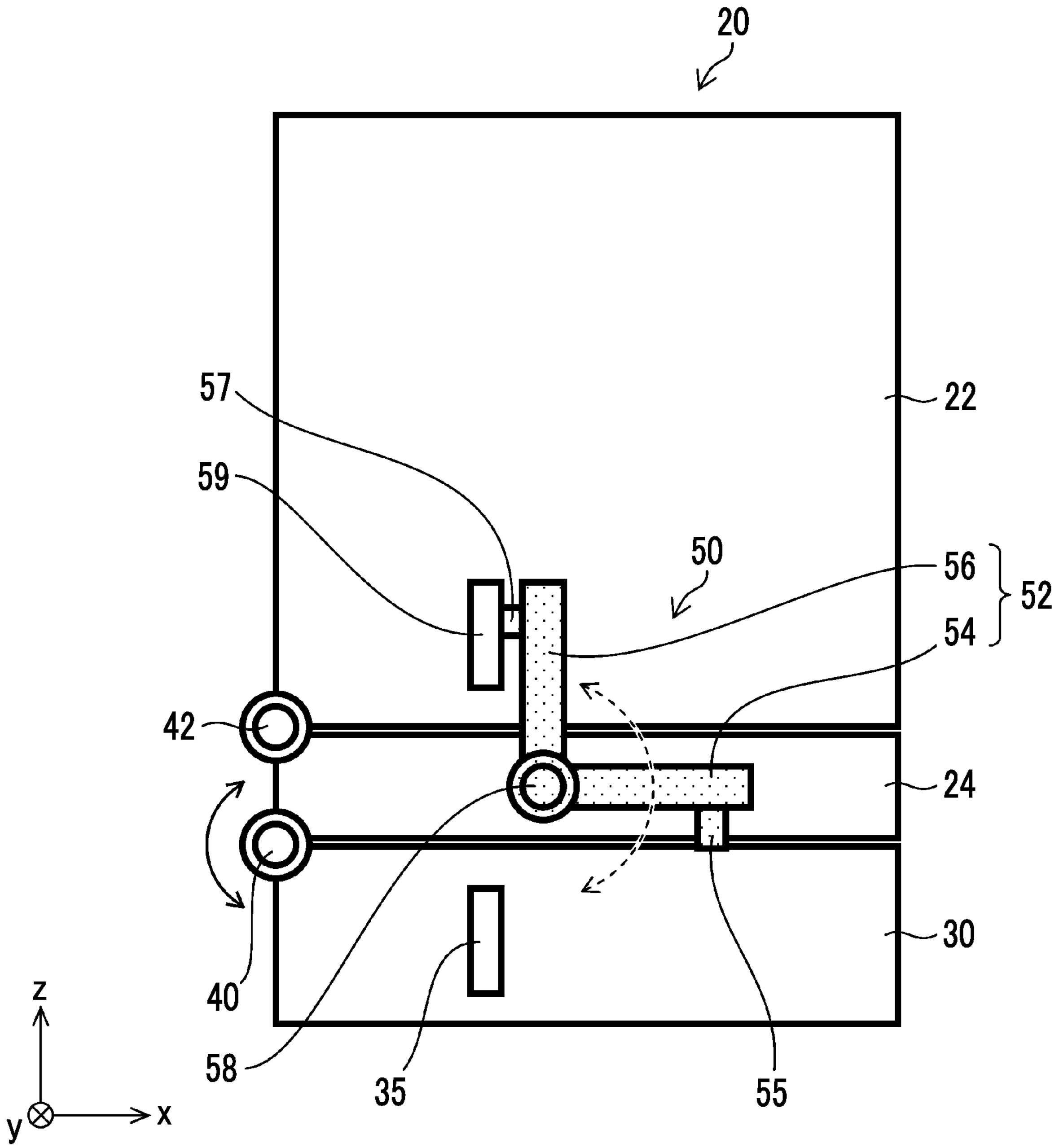
FIG. 6 is a schematic side view showing an example of the simultaneous movement avoidance mechanism, and shows a state in a case where ink stirring is performed.

FIGS. 5 and 6 are schematic views showing an example of a simultaneous movement avoidance mechanism 50. FIG. 5 shows a state in a case where the ink pouch 10 is attached and detached, and FIG. 6 shows a state in a case where the ink stirring is performed. The simultaneous movement avoidance mechanism 50 selectively realizes a first state (see FIG. 5) in which the rotational movement of the set portion 24 with respect to the main body by the first rotation shaft 40 is restrained and the rotational movement of the holder portion 22 with respect to the set portion 24 by the second rotation shaft 42 is permitted and a second state (see FIG. 6) in which the rotational movement of the set portion 24 with respect to the main body 30 by the first rotation shaft 40 is permitted and the rotational movement of the holder portion 22 with respect to the set portion 24 by the second rotation shaft 42 is restrained.

The simultaneous movement avoidance mechanism 50 comprises a rotary connecting member 52. The connecting member 52 is an L-shaped member having a first arm 54 and a second arm 56, and an L-shaped intersection portion is supported by the set portion 24 via a third rotation shaft 58. In a case where the ink pouch 10 is attached and detached, as shown in FIG. 5, an engaging part 55 provided at a tip part of the first arm 54 of the connecting member 52 is engaged with an engaged part 35 provided on the main body 30 side, whereby the first arm 54 is connected to the main body 30, and the set portion 24 and the main body 30 are integrated via the first arm 54. In this case, the second arm 56 is not engaged with the holder portion 22.

That is, as shown in FIG. 5, a state in which the first arm 54 is connected to the main body 30 is a state in which the set portion 24 is restrained by the main body 30, and in a state shown in FIG. 5, the rotation of the set portion 24 by the first rotation shaft 40 is restrained, so that the set portion 24 cannot be rotated. On the other hand, the holder portion 22 can be rotated about the second rotation shaft 42, and the ink pouch 10 can be attached and detached by moving the holder portion 22. The engaging part 55 and the engaged part 35 may be mechanically connected or may be connected by using magnetic force. The same applies to an engaging part 57 and an engaged part 59, which will be described below.

In a case where the ink stirring operation is performed, the connecting member 52 is rotated by 90 degrees in the counterclockwise direction from the state shown in FIG. 5 to obtain the state shown in FIG. 6. Since the state of FIG. 5 and the state of FIG. 6 can be switched by one operation (one motion) of rotating the connecting member 52 by 90 degrees, the operation of selectively switching the states is simple.

As shown in FIG. 6, an engaging part 57 provided at a tip part of the second arm 56 of the connecting member 52 is engaged with an engaged part 59 provided on the holder portion 22 side, whereby the second arm 56 is connected to the holder portion 22, and the set portion 24 and the holder portion 22 are integrated via the second arm 56. In this case, the first arm 54 is not engaged with the main body 30.

That is, as shown in FIG. 6, a state in which the second arm 56 is connected to the holder portion 22 is a state in which the holder portion 22 is restrained by the set portion 24, and in a state of FIG. 6, the holder portion 22 and the set portion 24 can be integrally rotated about the first rotation shaft 40 to stir the ink. On the other hand, the rotation of the holder portion 22 is restrained by the second rotation shaft 42, and the holder portion 22 cannot be relatively moved (rotated) with respect to the set portion 24. As a result, extra force is less likely to be applied to the fitting connection portion between the mouthpiece 14 and the fitting part 28, and it is possible to suppress the scattering of the ink during stirring.

The simultaneous movement avoidance mechanism 50 is an example of the “avoidance mechanism” in the present disclosure. The rotation position of the connecting member 52 shown in FIG. 5 is an example of a “first position” in the present disclosure, and the rotation position of the connecting member 52 shown in FIG. 6 is an example of a “second position” in the present disclosure. Although the rotary connecting member 52 is illustrated in FIGS. 5 and 6, a sliding connecting member may be adopted.

Regarding Axial Direction of Rotation Shaft

It is preferable that the axial directions of the first rotation shaft 40 and the second rotation shaft 42 are designed based on the shape of the ink pouch 10. From the viewpoint of improving the stirring performance of the ink, it is desirable that the rotation direction in which the integral structure of “the holder portion 22 and the set portion 24” rotates with respect to the main body 30 during the ink stirring is a direction in which a major axis of the ink pouch 10 is made to largely swing.

The major axis of the ink pouch 10 as used herein is an axis in the longitudinal direction in the shape of the ink pouch 10, and the direction of the longest dimension among the length direction (longitudinal direction), the width direction (lateral direction), and the thickness (depth) direction of the ink pouch 10 may be referred to as the major axis. In a case of the present example, the length direction parallel to the orientation of the mouthpiece 14 of the ink pouch 10 corresponds to the major axis. The orientation of the mouthpiece 14 means an orientation in which the ink flows out of the mouthpiece 14.

Assuming that the length of the ink pouch 10 in the longitudinal direction is L1, the width is L2, and the thickness is L3, the ink pouch 10 of the present example satisfies a relationship of L1>L2>L3. It is preferable that the first rotation shaft 40 is parallel to the direction of the smallest value (here, the thickness direction) among the dimensions in the directions. The length direction (longitudinal direction), the width direction (lateral direction), and the thickness (depth) direction of the ink pouch 10 are a “first direction”, a “second direction”, and a “third direction” in the present disclosure, respectively.

For convenience of description, as shown in FIG. 2, orthogonal coordinate axes of an x-axis, a y-axis, and a z-axis will be defined and described. Here, it is assumed that the z-axis is parallel to the direction of gravitational force. In FIG. 2, the major axis of the ink pouch 10 is disposed parallel to the z-axis direction. In FIG. 2, the width direction of the ink pouch 10 is the x-axis direction, and the thickness direction is the y-axis direction. In order to make the major axis of the ink pouch 10 swing largely, the axial direction of the first rotation shaft 40 may be parallel to the x-axis direction as well as parallel to the y-axis direction.

However, in a printing apparatus, in a case where ink packs of a plurality of colors such as cyan, magenta, yellow, and black are used in addition to the white ink, ink packs of other colors can be arranged side by side in the y-axis direction of FIG. 2, for example. In such a case, if the set portion 24 is rotated about a rotation shaft parallel to the x-axis, it may be necessary to interfere with an adjacent ink pack or to secure a wide space for rotational movement. Therefore, as described with reference to FIGS. 2 to 5, it is more desirable to configure the first rotation shaft 40 in parallel to the y-axis. The same applies to the second rotation shaft 42, and it is desirable that the second rotation shaft 42 and the first rotation shaft 40 are parallel to each other.

Advantages of Present Embodiment

According to the mounting mechanism 20 for the ink pouch 10 according to the present embodiment and the ink stirring method using the mounting mechanism 20, a damage of the mouthpiece 14 can be suppressed, and efficient ink stirring can be performed.

Other Application Examples

Although the above-described embodiment is described assuming the stirring of the white ink, the technique of the present disclosure is not limited to the mounting mechanism for the ink pouch 10 of the white ink, and can be applied as a mechanism for mounting various types of liquid containers that contain a liquid requiring stirring.

Regarding Combination of Embodiments and Modification Examples

The configurations described in the above-described embodiment and the matters described in the modification example can be used in combination as appropriate, or some of the matters can be replaced.

Others

The present disclosure is not limited to the above-described embodiment, and various modifications can be made without departing from the spirit of the technical idea of the present disclosure.

EXPLANATION OF REFERENCES

10: ink pouch
12: sealed bag
14: mouthpiece
15: recess portion
20: mounting mechanism
22: holder portion
23: groove
24: set portion
28: fitting part
30: main body
34: tube
35: engaged part
40: first rotation shaft
42: second rotation shaft
50: simultaneous movement avoidance mechanism
52: connecting member
54: first arm
55: engaging part
56: second arm
57: engaging part
58: third rotation shaft
59: engaged part

What is claimed is:

1. A mounting mechanism for a liquid container, the mechanism comprising:

a holder portion that fixes a mouthpiece serving as an outlet of a liquid of a liquid container in which the liquid is contained and that holds the liquid container;

a set portion that has a fitting part fitted to the mouthpiece and causing the liquid to flow out of the mouthpiece;

a tube that communicates with the fitting part; and a main body that is connected to the set portion by using the tube, wherein the set portion is movable with respect to the main body, the set portion is connected to the main body via a first rotation shaft, the set portion is rotatably movable about the first rotation shaft with respect to the main body, the holder portion is connected to the set portion via a second rotation shaft, and the holder portion is rotatably movable about the second rotation shaft with respect to the set portion.

2. The mounting mechanism for a liquid container according to claim 1, wherein the set portion is separable from the main body within a range where the tube reaches.

3. The mounting mechanism for a liquid container according to claim 1, wherein a rotation direction of the set portion by the first rotation shaft is a top-bottom direction.

4. The mounting mechanism for a liquid container according to claim 1, wherein a direction of a smallest value among dimensions in directions of a length, a width, and a thickness of the liquid container is parallel to the first rotation shaft.

5. The mounting mechanism for a liquid container according to claim 1, wherein, in a case where a length direction of the liquid container parallel to an orientation of the mouthpiece is a first direction, a width direction of the liquid container orthogonal to the first direction is a second direction, and a thickness direction of the liquid container orthogonal to the first direction and the second direction is a third direction, assuming that a length of the liquid container in the first direction is L1, a width of the liquid container in the second direction is L2, and a thickness of the liquid container in the third direction is L3, a relationship of L1>L2>L3 is satisfied, and the first rotation shaft is parallel to the third direction.

6. The mounting mechanism for a liquid container according to claim 1, wherein a rotation direction of the holder portion by the second rotation shaft is a top-bottom direction.

7. The mounting mechanism for a liquid container according to claim 1, wherein the mouthpiece and the fitting part are fitted to each other by rotatably moving the holder portion that holds the liquid container about the second rotation shaft.

8. The mounting mechanism for a liquid container according to claim 1, wherein the first rotation shaft and the second rotation shaft are parallel to each other.

9. The mounting mechanism for a liquid container according to claim 1, further comprising:

an avoidance mechanism for avoiding a simultaneous movement of a rotational movement of the set portion with respect to the main body by the first rotation shaft and a rotational movement of the holder portion with respect to the set portion by the second rotation shaft.

10. The mounting mechanism for a liquid container according to claim 9, wherein the avoidance mechanism selectively realizes a first state in which the rotational movement of the set portion with respect to the main body by the first rotation shaft is restrained and the rotational movement of the holder portion with respect to the set portion by the second rotation shaft is permitted and a second state in which the rotational movement of the set portion with respect to the main body by the first rotation shaft is permitted and the rotational movement of the holder portion with respect to the set portion by the second rotation shaft is restrained.

11. The mounting mechanism for a liquid container according to claim 10, wherein the avoidance mechanism includes a connecting member that selectively integrates the set portion with either the main body or the holder portion, and the connecting member is movable between a first position where the first state is attained by engagement of the connecting member with the main body and a second position where the second state is attained by engagement of the connecting member with the holder portion.

12. The mounting mechanism for a liquid container according to claim 11, wherein the connecting member is rotatably supported by the set portion via a third rotation shaft.

13. The mounting mechanism for a liquid container according to claim 9, wherein the avoidance mechanism is switchable between a state in which the rotational movement of the set portion with respect to the main body by the first rotation shaft is possible and a state in which the rotational movement of the holder portion with respect to the set portion by the second rotation shaft is possible in a single operation.

14. The mounting mechanism for a liquid container according to claim 1, wherein the liquid is an ink, and the liquid container is a pouch-shaped ink cartridge.

15. The mounting mechanism for a liquid container according to claim 1, wherein the mouthpiece is made of plastic.

16. The mounting mechanism for a liquid container according to claim 1, wherein the liquid is a white ink containing a white pigment.

17. An ink stirring method for a liquid container, the method being performed using a mounting mechanism for a liquid container including a holder portion that fixes a mouthpiece serving as an outlet of a liquid of the liquid container in which the liquid is contained and that holds the liquid container, a set portion that has a fitting part fitted to the mouthpiece and causing the liquid to flow out of the mouthpiece, a tube that communicates with the fitting part, and a main body that is connected to the set portion by using the tube and receives supply of the liquid via the tube, the method comprising:

fitting the mouthpiece and the fitting part to each other in a state in which the liquid container is held in the holder portion; and stirring the liquid inside the liquid container by integrally moving the holder portion and the set portion with respect to the main body in a state in which the mouthpiece and the fitting part are fitted to each other, wherein the set portion is connected to the main body via a first rotation shaft, the set portion is rotatably movable about the first rotation shaft with respect to the main body, the holder portion is connected to the set portion via a second rotation shaft, and the holder portion is rotatably movable about the second rotation shaft with respect to the set portion.

* * * * *